2,747,260
Patented May 29, 1956

2,747,260

METAL-CERAMIC MATERIALS AND METHOD OF MAKING SAME

George M. Carlton and Lee S. Busch, Indianapolis, Ind., assignors to P. R. Mallory & Co., Inc., Indianapolis, Ind., a corporation of Delaware No Drawing. Application February 26, 1952, Serial No. 273,569

18 Claims. (Cl. 29—182.5)

This invention relates to metal-ceramic compositions and is specifically directed toward such means and methods including the composition and fabrication of new metal-ceramic materials.

It is an object of the present invention to provide new types of compositions or materials comprising metallic or intermetallic constituents and ceramic constituents in combination.

Yet another object of the present invention is the fabrication of composite materials embodying metallic or intermetallic constituents and ceramic constituents.

Still another object of the present invention is to produce metal-ceramic compositions and materials possessing thermal shock resistance, oxidation resistance, and strength at high temperatures.

Another object of the present invention is to provide composite materials including metallic or intermetallic constituents and ceramic constituents which possess various electrical and thermal conductivities, depending upon their specific uses.

Another object of the present invention is to develop a process by which the intermetallic constituents and ceramic constituents comprising the materials of the present invention can be fabricated into bodies having desired shape and specifications.

Still another object of the present invention is to provide a process by which metal-ceramic materials can be bonded to other metallic or ceramic materials.

The invention, in another of its aspects, relates to novel features of the instrumentalities described herein for teaching the principal object of the invention and to the novel principles employed in the instrumentalities whether or not these features and principles may be used in the said object and/or in the said field.

Other and further objects of the invention will become apparent from the following description.

Broadly speaking, the novel invention of the composite metallic and ceramic compositions described herein involves two basic phases or constituents, namely, the metallic or intermetallic phase, and the ceramic phase. The metallic or intermetallic compound phase hereof is used to impart and control the thermal and electrical conductivities. This phase serves to increase thermal shock resistance and also may impart resistance to deformation at high temperatures. The ceramic phase hereof is used to impart resistance to deformation under load at high temperatures and, in some cases, to provide protection for the metallic phase against oxidation. This phase may also serve as the mechanical or chemical bond in the metal-ceramic combination.

In fabricating the composite material, the choice of materials for the metallic or intermetallic phase is of particular importance. With the exception of the noble metals, most metals and alloys tend to oxidize at elevated temperatures except in those cases where a protective film or coating is formed. Their use is therefore limited to neutral or reducing atmospheres.

It has been found that certain metallic or intermetallic compounds possess greater oxidation resistance than their individual components. Some of these compounds possess desirable electrical and thermal conductivities, and, in general, behave much as metals and alloys. Such a compound is molybdenum-disilicide, the principal metallic phase of the metal-ceramic combination hereinafter described.

In general, ceramics are composed of pure metal oxides and, as a consequence, the problem of oxidation at high temperatures is not presented. Where reducing atmospheres are present, the choice of oxides for the ceramic phase should be those which are refractory and stable under the prevailing conditions. In the metal-ceramic combination herein described, the principal constituent of the ceramic phase is aluminum oxide. The fluxing agent is calcium oxide, although other alkaline earth compounds may be used. Other ceramics may be used in the composite material, e. g. $ZrO_2$, $Cr_2O_3$, $SiO_2$, BeO, etc., with suitable fluxing and/or stabilizing agents.

It is to be noted that although sometimes in the technical literature, the carbides, nitrides, borides and silicides of metals have frequently been referred to as ceramic materials, they are herein referred to as metallic or intermetallic compounds mainly because they do possess the properties and characteristics of metals.

It is believed that a reason for the behavior of the $MoSi_2$—$Al_2O_3$—CaO material might be as follows. It is known that molybdenum disilicide is very resistant to oxidation. This characteristic is thought to be the result of the formation of a silicon dioxide coating. If aluminum oxide is brought into contact with this coating, a compound $3Al_2O_3 . 2SiO_2$ (mullite) forms upon firing. This compound thus forms a bond between the molybdenum disilicide and the aluminum oxide. The calcium oxide acts as the fluxing agent to promote the formation of this bond.

Another example of this principle can be demonstrated using $ZrB_2$ and $ZrO_2$ with CaO or MgO as the fluxing and/or stabilizing agent. The $ZrB_2$ oxidizes slightly to form a protective coating of $ZrO_2$. This coating with the aid of the flux diffuses into the excess $ZrO_2$ added as the ceramic phase of the composite material.

This principle may further be applied to those metals and alloys which rely on a dense and adherent scale for their resistance to oxidation. Among the metals which react in this manner are aluminum, chromium, nickel, silicon and beryllium. As alloy additions to other base metals, these metals confer upon them the same kind of protection from oxidation. The scale or oxide coating with the aid of a flux diffuses into the ceramic phase to form a bond.

The choice of materials for any combination must be made with due consideration to the characteristics desired in the composite article. To improve thermal shock, for example, the constituents should have good thermal conductivity. In addition, the coefficient of thermal expansion of each of the constituents should be closely matched. Also, it is desirable that there be no inversions (phase changes) in the individual constituents.

To illustrate the foregoing, and to bring out an important application thereof as well, the results obtained from a study of $MoSi_2$—$Al_2O_3$—CaO combination, here called composition "A," and which consists of 77.7% $MoSi_2$, 21.5% $Al_2O_3$ and 0.8% CaO, may be beneficial. This composition, hereinafter completely described, has a coefficient of thermal expansion of $7.86 \times 10^{-6}$ in./in./° C. for the range 22° C. to 1000° C., whereas fused alumina has a coefficient of $7.8 \times 10^{-6}$ in./in./° C. for the range 22° C. to 1000° C. The aforesaid composition "A" has withstood 25 cycles of a thermal shock test consisting of the following: A furnace was maintained at 1350° C. using city gas and compressed air; a specimen (2" x ⅜" x ⅜") was placed directly into the furnace a few inches ahead of the burner flame; time to temperature was less than one minute; after ten minutes at temperature, the specimen was withdrawn and placed directly in air blast; time out of the furnace was five minutes. No loss in strength resulted from the above test.

The application of a material, such as composition "A," can be made in the manufacture of spark plugs. An electrode of composition "A" was permanently bonded to a high alumina porcelain insulator using the principle previously described for the $MoSi_2$—$Al_2O_3$—CaO material. The maintenance of this bond is further enhanced due to the fact that the coefficients of thermal expansion for the two materials are closely matched.

The degree to which the metal-ceramic material will conduct heat or electricity will depend upon the amount and dispersion of the metallic phase. Depending upon the intended application, the amount of metallic phase can be controlled by its addition to the powder mixture. The dispersion of the metallic phase will be influenced by (a) the particle size of the metallic and ceramic powders, (b) the technique used in blending the powders, and (c) the ceramic component as it tends to cause shrinkage at a given temperature and to bring about more intimate contact of the particles.

The compositions may be fabricated by such methods as cold pressing and sintering, hot pressing, impregnation, extrusion and slip casting. However, the powder metallurgy technique of cold pressing and sintering, herein described, is quite adaptable to the $MoSi_2$—$Al_2O_3$—CaO material. Presintering and sintering operations are carried out in dissociated $NH_3$, although other atmospheres can be used. The process consists of:

1. Mixing the components, each in powder form.
2. Compacting the mixtures into solid form by cold pressing at pressures up to 50 tons per square inch.
3. Drying, if a wet mix is used.
4. Presintering at a temperature in the range 900° C. to 1350° C. to produce a body which can be readily shaped by machining and also to condition the material for the sintering treatment.
5. Sintering the body at a temperature in the range of 1400° C. to 1600° C. to improve density, strength, hardness, etc.
6. Grind to final size, if necessary.
7. Heat treating in an oxidizing atmosphere at a temperature in the range 1000° C. to 1500° C. to further improve density, strength, oxidation resistance, thermal shock resistance, surface finish, etc.

There are a great many uses for a high conductivity material, such as composition "A," viz. combustion chamber parts in jet engines, rockets, ram jets and gas turbines; parts subject to wear and erosion at room and elevated temperatures; and electrical and structural components for use at elevated temperatures.

Moreover, there are a great many possible uses for a high resistivity material, such as may be obtained from the fabrication of another composition "B," consisting of 56.5% $Al_2O_3$, 41.4% $MoSi_2$ and 2.1% CaO. This composition "B" can be used for induction heating fixtures and supports; electrical and structural components used at elevated temperatures; and wear and erosion resistant parts used at elevated temperatures.

The above mentioned composition "B" might be said to lie on the threshold of the conductive group of compositions from the $MoSi_2$—$Al_2O_3$—CaO system. For example, composition "C" consisting of 68.2% $Al_2O_3$, 29.2% $MoSi_2$ and 2.6% CaO, and composition "D" consisting of 81.5% $Al_2O_3$, 15.5% $MoSi_2$ and 3.0% CaO might well be considered as insulators. Neither of the two materials heated up when placed in a high frequency induction heating unit.

Compositions such as "E" consisting of 45.9% $Al_2O_3$, 52.4% $MoSi_2$ and 1.7% CaO and "F" consisting of 36.4% $Al_2O_3$, 62.2% $MoSi_2$ and 1.4% CaO have decreasing resistivities respectively. For example, the value for composition "E" was approximately 735 microhm-cm. and for composition "F" approximately 260 microhm-cm. Both of these materials reacted to the field of the high frequency heating unit, with composition "F" reaching a red heat faster than composition "E."

Materials such as compositions "B," "C," "D," "E" and "F" had modulii of rupture values in the range of 40,000 p. s. i. The thermal shock resistance of this group was lower than that of composition "A" due to the higher ceramic content. However, they are still superior to sintered alumina.

To illustrate the techniques and the principles hereinabove described, the specific composition "A" mentioned supra is now discussed:

ILLUSTRATION—COMPOSITION "A"

Metallic phase—Molybdenum disilicide.
Ceramic phase—97% alumina-3% lime.
Intended use—Specimen holder for a thermal shock furnace.

It is required:
1. That the material withstand the thermal shock due to placing a specimen directly into a stream of hot gases which maintains the furnace at 1350° C. and then removing same from the furnace to a station where a blast of air from a fan cools the specimen.
2. That the material does not oxidize at the test temperature in an oxidizing atmosphere.
3. That the material have sufficient strength and wear resistance at the test temperature.

Steps in fabrication of composition "A"

Powder mixture—77.7% $MoSi_2$, 21.5% $Al_2O_3$ and 0.8% CaO.
Compacting—Steel dies, 50 t. s. i. pressure.
Presintering—900–1350° C. in dissociated $NH_3$, stoking rate 20–40"/hr.
Machining—Easily shaped with ordinary tools—file, hack saw, high speed drills, carbide cutting tools for machine work, etc.
Sintering—1400–1600° C. in dissociated $NH_3$, stoking rate 5–25"/hr. This operation brings the material to its ultimate form, i. e., ultimate hardness, density, strength, etc.

Results

The material survived 25 cycles in the thermal shock apparatus without any apparent damage. Oxidation was negligible and no cracks resulted from the above treatment. The material was tested for cross breaking strength after the above use and showed no loss in strength.

Again, to further illustrate the techniques and principles involved, composition "B" hereinbefore referred to, is now specifically described:

ILLUSTRATION—COMPOSITION "B"

Metallic phase—Molybdenum disilicide.
Ceramic phase—97% alumina-3% lime.
Intended use—Brazing jig for supporting work during brazing in an induction heating unit.

It is required:
1. That the temperature of the brazing jig not be increased appreciably due to the high frequency field.
2. That the brazing jig not be damaged by the heat generated in the part being brazed.
3. That the brazing jig have good resistance to wear under normal usage.
4. That the brazing jig have good corrosion resistance to fluxes, atmospheres, etc.

Steps in fabrication of composition "B"

Powder mixture—56.5% Al₂O₃, 41.4% MoSi₂ and 2.1% CaO.
Compacting—Steel dies, 20 t. s. i. pressure.
Presintering—900–1350° C. in dissociated NH₄, stoking rate 20–40"/hr.
Machining—Easily shaped with ordinary tools—file, hack saw, high speed drills, carbide cutting tools for machine work, etc.
Sintering—1400–1600° C. in dissociated NH₃, stoking rate 5–25"/hr. This operation brings the material to its ultimate form, i. e. ultimate hardness, density, strength, etc.

Results

Became slightly warm to the touch after one minute in the high frequency field. After 2000 brazing cycles of approximate 20 seconds duration, the jig appeared in good condition.

In order to highlight the characteristics of composition "A" versus alumina, the following chart is provided:

|   | Composition "A" | Alumina |
| --- | --- | --- |
| Density (gm./CC.) | 5.1 | 4.0. |
| Melting point (°C.) | >1,800 | 2,050. |
| Mean Coefficient of Thermal Expansion 22° C.–1,000° C. (10⁻⁶ in./in./°C.) | 7.855 | 7.8. |
| Hardness (Rockwell) | >90 "A" | Shatters. |
| Modulus of Rupture (p. s. i.) | 35,000 | 40,000. |
| Approximate Limit of Oxidation Resistance (° C.) | 1,700 | No limit. |
| Electrical Resistivity (microhm-cm.) Room Temperature | 65 | 10²⁰. |

From the chart supra, the inherent valuable characteristics of the present novel invention of the composite materials embodying metallic or intermetallic constituents and ceramic constituents become apparent, and accordingly it is intended that the teachings exemplified therein be construed as broadly as consistent with the scope of the invention.

The practical range of molybdenum disilicide in the metal-ceramic bodies of the invention is between 10% and 90% by volume. The electrically conductive characteristics of the bodies are determined by their molybdenum disilicide content. Thus, generally speaking, metal-ceramic bodies containing less than 50% per volume molybdenum disilicide are poor conductors of electricity, while those containing more than 50% per volume molybdenum disilicide are good conductors of electricity. Obviously, by proper selection of the proportion of molybdenum disilicide and of the aluminum oxide or other ceramic constituents, any desired resistivity may be readily obtained within certain limits.

What is claimed is:

1. The method of making metal-ceramic bodies which comprises bringing, an intermetallic constituent of molybdenum disilicide into contact with a finely divided ceramic constituent essentially consisting of a refractory oxide selected from the group consisting of the oxides of aluminum, zirconium, chromium, silicon and beryllium and with a fluxing amount of an alkaline earth metal compound, and heating the constituents to a temperature sufficient to cause bonding thereof and the formation of an integral metal-ceramic body in which said constituents are uniformly distributed, the relative proportions of said constituents being so determined that the intermetallic constituent forms between 10% and 90% by volume of the body.

2. The method of making metal-ceramic bodies which comprises intimately mixing finely divided molybdenum disilicide with a finely divided ceramic material essentially consisting of aluminum oxide and also containing a fluxing amount of an alkaline earth metal compound forming a compact from the mixture, and sintering said compact at an elevated temperature to bond the molybdenum disilicide and ceramic particles into an integral metal-ceramic body, the relative proportions of the constituents being so determined that molybdenum disilicide constitutes between 10% and 90% by volume of the body.

3. The method of making metal-ceramic bodies which comprises forming an intimate mixture of molybdenum disilicide powder with a ceramic powder essentially consisting of aluminum oxide and also containing a fluxing amount of calcium oxide, pressing a compact from the mixture, and sintering said compact at an elevated temperature under non-oxidizing conditions to bond the molybdenum disilicide and ceramic particles into an integral metal-ceramic body, the relative proportions of the constituents being so determined that molybdenum disilicide constitutes between 10% and 90% by volume of the body.

4. The method of making metal-ceramic bodies characterized by good thermal shock resistance which comprises forming an intimate mixture of molybdenum disilicide powder with a ceramic powder essentially consisting of a refractory oxide selected of the group consisting of the oxides of aluminum, zirconium, chromium, silicon and beryllium of which the coefficient of thermal expansion substantially matches that of molybdenum disilicide with a fluxing amount of an alkaline earth metal compound, pressing a compact from the mixture, and sintering said compact at an elevated temperature to bond the molybdenum disilicide and ceramic particles into an integral metal-ceramic body, the relative proportions of the constituents being so determined that molybdenum disilicide constitutes between 10% and 90% by volume of the body.

5. The method of making metal-ceramic bodies characterized by relatively high electrical conductivity and good resistance to thermal shock which comprises forming an intimate mixture of molybdenum disilicide powder with a ceramic powder essentially consisting of aluminum oxide and also containing a fluxing amount of calcium oxide, pressing a compact from the mixture, and sintering said compact at an elevated temperature to bond the molybdenum disilicide and ceramic particles into an integral metal-ceramic body, the relative proportions of the constituents being so determined that molybdenum disilicide constitutes between 50% and 90% by volume of the body.

6. The method of making metal-ceramic bodies characterized by low or negligible electrical conductivity and good resistance to thermal shock which comprises forming an intimate mixture of molybdenum disilicide powder with a ceramic powder essentially consisting of aluminum oxide including a fluxing amount of calcium oxide, pressing a compact from the powder mixture, and sintering said compact at an elevated temperature to bond the molybdenum disilicide and ceramic particles into an integral metal-ceramic body, the relative proportions of the constituents being so determined that molybdenum disilicide constitutes between 10% and 50% by volume of the body.

7. The method of making metal-ceramic bodies which comprises forming an intimate mixture of molybdenum disilicide powder with a ceramic powder essentially consisting of aluminum oxide with a fluxing amount of calcium oxide, pressing a compact from the powder mixture, presintering the compact at a temperature between 900° and 1350° C., and then sintering the compact at a temperature between 1400° and 1600° C. to bond the particles into an integral metal-ceramic body, the relative proportions of the constituents being so determined that molybdenum disilicide constitutes between 10% and 90% by volume of the body.

8. The method of making metal-ceramic bodies which comprises forming an intimate mixture of molybdenum disilicide powder with a ceramic powder essentially consisting of aluminum oxide with a fluxing amount of calcium oxide, pressing a compact from the powder mixture, presintering the compact in a non-oxidizing atmosphere at a temperature between 900° and 1350° C., sintering the compact in a non-oxidizing atmosphere at a temperature between 1400° and 1600° C., and heat treating the sintered compact in an oxidizing atmosphere at a temperature between 1000° and 1500° C., the relative proportions of the constituents being so determined that molybdenum disilicide constitutes between 10% and 90% by volume of the sintered body.

9. A metal-ceramic body having good resistance to thermal shock consisting of 10% to 90% by volume of a metallic phase constituted by molybdenum disilicide, and of a ceramic phase essentially consisting of a refractory oxide selected from the group of oxides of aluminum, zirconium, chromium, silicon and beryllium with a fluxing amount of an alkaline earth metal compound, said phases having substantially similar coefficients of thermal expansion and being uniformly distributed in said body and being bonded to each other.

10. A metal-ceramic body composed of 10% to 90% by volume of a metallic phase of molybdenum disilicide, and the balance being a ceramic phase essentially consisting of aluminum oxide and also containing a fluxing amount of an alkaline earth metal compound, said phases being uniformly admixed with and being bonded to each other.

11. A metal-ceramic body composed of 10% to 90% by volume of a metallic phase of molybdenum disilicide, and the balance being a ceramic phase consisting of aluminum oxide with a fluxing amount of calcium oxide, said phases being uniformly admixed with and being bonded to each other.

12. A metal-ceramic body having the characteristic of good electrical conductivity composed of 50% to 90% by volume of a metallic phase of molybdenum disilicide, and the balance being a ceramic phase essentially consisting of aluminum oxide with a fluxing amount of calcium oxide, said phases being uniformly admixed with and being bonded to each other.

13. A metal-ceramic body having the characteristics of poor electrical conductivity composed of 10% to 50% by volume of a metallic phase of molybdenum disilicide, and the balance being a ceramic phase essentially consisting of aluminum oxide with a fluxing amount of calcium oxide, said phases being uniformly admixed with and being bonded to each other.

14. A metal-ceramic body consisting of about 77.7% $MoSi_2$, about 21.5% $Al_2O_3$, and about 0.8% CaO.

15. A metal-ceramic body consisting of about 56.5% $Al_2O_3$, about 41.4% $MoSi_2$, and about 2.1% CaO.

16. A metal-ceramic body consisting of about 68.2% $Al_2O_3$, about 29.2% $MoSi_2$ and about 2.6% CaO.

17. A metal-ceramic composition consisting of about 81.5% $Al_2O_3$, about 15.5% $MoSi_2$ and about 3.0% CaO.

18. A metal-ceramic body consisting of about 45.9% $Al_2O_3$, about 52.4% $MoSi_2$ and about 1.7% CaO.

References Cited in the file of this patent

UNITED STATES PATENTS

| | | |
|---|---|---|
| 1,858,300 | Laise | May 17, 1932 |
| 1,981,719 | Comstock | Nov. 20, 1934 |
| 2,109,246 | Boyer et al. | Feb. 22, 1938 |
| 2,283,250 | Goldschmidt | May 19, 1942 |
| 2,406,275 | Wejuarth | Aug. 20, 1946 |
| 2,599,185 | Lepp et al. | June 3, 1952 |

FOREIGN PATENTS

| | | |
|---|---|---|
| 478,016 | Great Britain | of 1938 |